Patented Aug. 27, 1946

2,406,717

UNITED STATES PATENT OFFICE 2,406,717

VINYL ESTER CO-POLYMERIZATION PRODUCTS

Charles Allen Thomas, Dayton, Ohio, assignor to Monsanto Chemical Company, St. Louis, Mo., a corporation of Delaware No Drawing. Application October 8, 1940, Serial No. 360,224

10 Claims. (Cl. 260—86)

This invention relates to new and useful polymerizates and a process of preparing the same.

It is an object of the present invention to prepare polymerizates with new and improved properties. Another object is to provide conjoint polymers with increased flexibility. It is a further object to prepare co-polymers with increased light resistance. Other objects of this invention will become apparent hereinafter.

It has been found, according to the present invention, that by subjecting mixtures of vinyl fluoride and vinyl esters of lower aliphatic acids to polymerizing conditions, new polymerizates can be prepared with unexpected and improved properties. The following are specific examples illustrative but not limitative of the present invention.

Example 1

Substantially 14 parts by weight of vinyl acetate and substantially 0.029 part by weight of benzoyl peroxide were placed in a suitable vessel capable of withstanding pressure, as for example, a stainless steel bomb. The bomb and its contents were then cooled in a suitable manner, as for example, by immersing the bomb in liquid air. Thereafter, substantially 12.4 parts by weight of vinyl fluoride were distilled into the bomb and the bomb closed. The bomb and its contents were then warmed with suitable mixing to substantially 50° C. and maintained at substantially that temperature and at a pressure between about 340 and about 420 pounds per square inch gauge pressure for substantially 12 days. The resulting co-polymer, a solid material, was treated in a suitable manner, as for example, by dissolving the product in sufficient acetone to produce a solution with a solid content of about 5%, filtering this solution, precipitating the polymerizate with water and finally drying the precipitated resin by evacuation at room temperature.

The co-polymer, thus purified, was a tough, slightly elastic, resilient and substantially colorless material. This polymerizate was found to be soluble in acetone, ethyl acetate, benzene, ethylene dichloride and dioxane. It was only swelled by contact with ethanol and was insoluble in hexane. Furthermore, this product was found to possess a moderate softening point well below its decomposition point.

In addition to the foregoing valuable properties, it was found that a film of the product in this example was transparent and substantially water resistant. Also, such a film withstood substantially 6300 folding cycles before failure, when tested on a Massachusetts Institute of Technology Folding Endurance Tester, manufactured by the Tinius-Olsen Testing Machine Company, Philadelphia, Pennsylvania. A film prepared from a commercial co-polymer of vinyl chloride and vinyl acetate when subjected to the same folding test failed after substantially 600 folding cycles. The light stability of a film of the co-polymer of vinyl fluoride and vinyl acetate was found to be exceptional. After 21 days exposure to the rays from an S-1 type General Electric Company sun lamp at a distance of substantially 16 inches, this polymerizate was still tough and colorless. In contrast to this outstanding light resistance, a commercial co-polymer of vinyl chloride and vinyl acetate had started to discolor after an exposure of 14 days under similar conditions and had become brittle after an exposure period of 19 days.

Example 2

A mixture of substantially 15 parts by weight of vinyl fluoride, substantially 15 parts by weight of vinyl formate and substantially 0.0375 part by weight of benzoyl peroxide was prepared for polymerization in substantially the same manner as the mixture in Example 1. The present mixture was then warmed with suitabel mixing to substantially 40° C. and maintained at substantially that themperature for substantially 7 days at a pressure between about 320 and 480 pounds per square inch gauge pressure.

The resulting co-polymer was treated in a manner similar to that employed in Example 1 and a purified solid product was thus obtained that was tough, elastic and substantially colorless. This polymerizate was found to be soluble in acetone, chloroform and dioxane, swelled by contact with benzene and ethyl acetate and insoluble in hexane and ethyl alcohol. This product, like that in Example 1, had a softening point well below its decomposition point. A film of this material was transparent, extremely flexible and showed good resistance to light.

It is evident that the new products of the present invention, as illustrated by the foregoing specific examples, possess many valuable and unexpected properties that make the use of these new materials advantageous for many of the applications of plastic materials. Furthermore, other polymerized or polymerizable materials, plasticizers, fillers, coloring agents and other materials may be added to the products of this invention in any suitable manner, such as by mixing in a Banbury mixer or on mixing rolls.

The products of this invention may be mixed, rolled, calendered, extruded, molded, or otherwise formed with and without the addition of added materials of the types listed above. If desired, these new co-polymers may be dissolved in suitable solvents with and without added materials, applied in any desired manner, and the solvent then removed by evaporation.

There are many variations that may be introduced into the process of preparing the new polymerizates of this invention. Thus, for example, the process of this invention is not limited to any particular type of polymerization apparatus, type of catalyst or other means of accelerating the polymerization, amount of catalyst, polymerization temperature, polymerization pressure—except to avoid escape of volatile components, duration of polymerization or method of purification. While vinyl fluoride and vinyl esters of the lower aliphatic acids may be mixed in any desired proportions and the mixture polymerized, it is generally desirable that the vinyl ester of the lower aliphatic acid be present in an amount at least equal to the amount of vinyl fluoride present. Furthermore, the mixtures of vinyl esters of lower aliphatic acids and vinyl fluoride may be polymerized in suitable solvents or in suitable liquids that are non-solvents for the monomeric and/or polymeric materials. Thus, the particular properties desired in the product and the use to which the material is to be placed can govern to a considerable degree the exact polymerizing conditions employed.

This invention is limited solely by the claims attached hereto.

What is claimed is:

1. A process of preparing a co-polymer comprising subjecting to polymerizing conditions a mixture of vinyl fluoride and a vinyl ester of a lower saturated fatty acid.

2. A process of preparing a conjoint polymer comprising polymerizing a mixture of vinyl fluoride and vinyl acetate in the presence of an organic peroxide catalyst.

3. A process of preparing a co-polymer comprising polymerizing in admixture vinyl fluoride and vinyl acetate in the presence of benzoyl peroxide.

4. A process of preparing a co-polymer comprising polymerizing a mixture of vinyl fluoride and vinyl formate in the presence of benzoyl peroxide.

5. A process of preparing a co-polymer comprising polymerizing a mixture comprising vinyl fluoride and a vinyl ester of a lower saturated fatty acid, the vinyl ester of the lower aliphatic acid being present in said mixture in an amount at least equal to the amount of vinyl fluoride present.

6. A process of preparing a co-polymer comprising polymerizing a mixture comprising vinyl fluoride and vinyl acetate, the vinyl acetate being present in said mixture in an amount at least equal to the amount of vinyl fluoride present.

7. A co-polymer of vinyl fluoride and a vinyl ester of a lower saturated fatty acid.

8. A co-polymer of vinyl fluoride and vinyl acetate.

9. A process which comprises polymerizing a mixture of vinyl acetate and vinyl fluoride, with vinyl acetate in greater proportion by weight than vinyl fluoride, at a temperature of about 50° C. and at a pressure between about 340 and about 420 pounds per square inch gauge with benzoyl peroxide as a catalyst.

10. A copolymer of vinyl fluoride and vinyl formate.

CHARLES ALLEN THOMAS.